(12) United States Patent
Gloss et al.

(10) Patent No.: US 11,435,049 B2
(45) Date of Patent: Sep. 6, 2022

(54) LIGHT DEVICE OF A MOTOR VEHICLE

(71) Applicant: Varroc Lighting Systems, s.r.o., Senov U Noveho Jicina (CZ)

(72) Inventors: Tomas Gloss, Vitkov (CZ); Jiri Kochanek, Frydek-Mistek (CZ); Ludek Mazal, Tisek (CZ)

(73) Assignee: Varroc Lighting Systems, S.r.o., Senov U Noveho (CZ)

( * ) Notice: Subject to any disclaimer, the term of this patent is extended or adjusted under 35 U.S.C. 154(b) by 0 days.

(21) Appl. No.: 17/191,982

(22) Filed: Mar. 4, 2021

(65) Prior Publication Data
US 2021/0278056 A1 Sep. 9, 2021

(30) Foreign Application Priority Data
Mar. 9, 2020 (CZ) .................................. CZ2020-123

(51) Int. Cl.
*F21S 41/40* (2018.01)
*F21S 41/20* (2018.01)
(Continued)

(52) U.S. Cl.
CPC ............ *F21S 41/40* (2018.01); *B60R 13/005* (2013.01); *F21S 41/28* (2018.01); *F21S 41/285* (2018.01);
(Continued)

(58) Field of Classification Search
CPC .......... F21S 41/40; F21S 41/28; F21S 41/285; F21S 43/245; F21S 43/315; F21S 43/33; B60R 13/00; B60R 13/005
See application file for complete search history.

(56) References Cited

U.S. PATENT DOCUMENTS

| | | | | |
|---|---|---|---|---|
| 6,889,456 B2 * | 5/2005 | Shibata | ................ | B60Q 1/323 40/544 |
| 9,714,749 B1 * | 7/2017 | Salter | ..................... | B60Q 1/28 |

(Continued)

FOREIGN PATENT DOCUMENTS

| | | |
|---|---|---|
| CN | 108877568 A | 11/2018 |
| CN | 109285475 A | 1/2019 |
| GB | 2527774 A | 1/2016 |

OTHER PUBLICATIONS

Search Report dated Jul. 21, 2020, from Corresponding Czech Patent Application No. PV 2020-123 (3 pages).

*Primary Examiner* — Matthew J. Peerce
(74) *Attorney, Agent, or Firm* — Hovey Williams LLP

(57) ABSTRACT

The light device of a motor vehicle comprises a light unit (4) and a cover (2). The light unit (4) comprises a light guide (7) with a front surface (8) for the exit of light rays (10) from the light guide (7) situated opposite the cover (2), a rear surface (9) comprising unbinding elements (73) configured to reflect light rays (10) towards the front surface (8), and at least one binding surface (71) to bind light rays (10) emitted by the light source (6) associated with the binding surface (71) to the light guide (7). The light device further comprises a carrier (5) situated opposite the rear surface (9) of the light guide (7) and configured to reflect light rays (10) that have escaped from the light guide (7) through the rear surface (9) back to the light guide (7). The cover (2) comprises at least one impermeable region (22) preventing light rays (10) from passing out of the cover (2), and at least one permeable region (21) to allow light rays (10) to pass through the cover (2).

19 Claims, 2 Drawing Sheets

Figure 1:
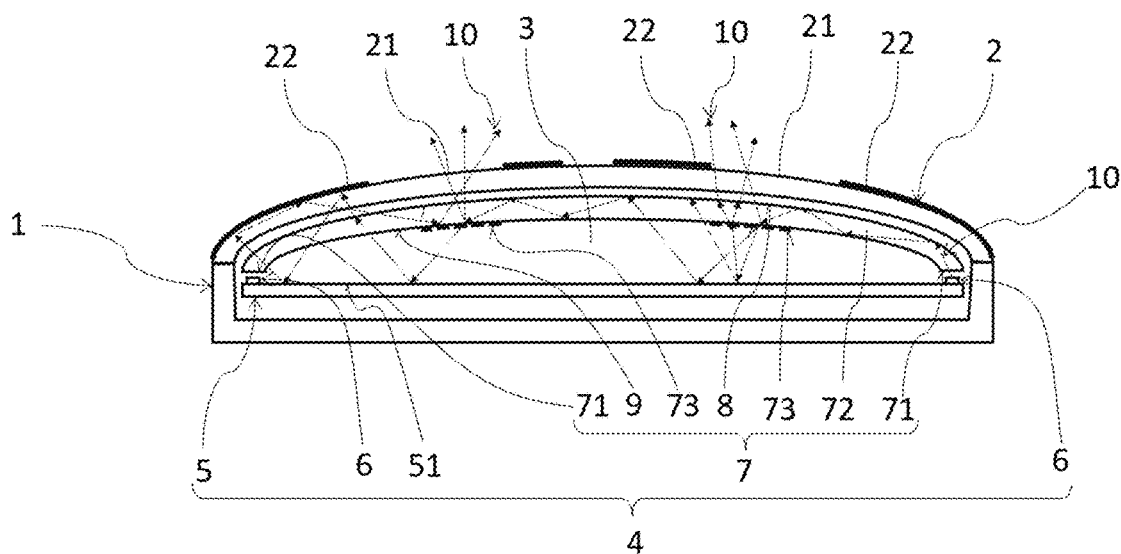

(51) Int. Cl.
  *B60R 13/00* (2006.01)
  *F21S 43/20* (2018.01)
  *F21S 43/239* (2018.01)
  *F21S 43/245* (2018.01)

(52) U.S. Cl.
  CPC ............ *F21S 43/26* (2018.01); *F21S 43/239* (2018.01); *F21S 43/245* (2018.01)

(56) References Cited

U.S. PATENT DOCUMENTS 10,967,781 B2 * 4/2021 Ho .................... B60Q 1/0017
2017/0357044 A1 * 12/2017 Kuramitsu ........... G02B 6/0088

* cited by examiner

LIGHT DEVICE OF A MOTOR VEHICLE

RELATED APPLICATIONS

This application claims the priority benefit of Czech Provisional Patent Application Ser. No. PV 2020-123 entitled "A light device of a motor vehicle," filed Mar. 9, 2020, the entire disclosure of which is incorporated herein by reference.

FIELD OF THE INVENTION

The invention relates to a light device of a motor vehicle and especially a light device producing the required shape of an inscription or logo visible when the light sources are on and/or off.

BACKGROUND INFORMATION

Various badges and logos of motor vehicles are especially known that for instance identify the manufacturer or type of a particular vehicle. These logos are generally situated at the front and rear end of the vehicle. Badges are produced for example as metallic or plastic plates, and at night, they are usually poorly visible or are not visible at all. Manufacturers of motor vehicles would like their logos and badges to be clearly visible in the dark as well.

Various prior-art light devices are known that enable backlighting of an inscription or logo. For instance, the documents CN208585195U, DE102017217507A1, DE102017214129A1 disclose light devices comprising a rear base and an at least partly transparent front cover wherein the front cover and the base are connected to each other and form an enclosed chamber. In the chamber, various lighting means are situated that are configured in such a way that light can be emitted from the light device in predetermined regions to create the required inscription or logo. A disadvantage of the prior art is the fact that the arrangement of individual components brings certain installation requirements. In light devices, the use of standard point light sources, e.g., LED's, in combination with light guides and light filters brings certain geometric limits and restrictions, influencing the inner installation space of the light device.

The object of the invention is to design a light device that has low requirements for integration into the vehicle body, makes it possible to create spatial light patterns or meet other design requirements for the output light beam, such as the ability to create an inscription or logo that will be legible in the active and/or inactive state.

SUMMARY OF THE INVENTION

The objects of the invention are met by a light device of a motor vehicle comprising a light unit and a cover that separates the light unit from the external environment of the light device wherein the light unit comprises a light guide with a front surface for the exit of light rays from the light guide situated opposite the cover, a rear surface comprising unbinding elements configured to reflect light rays towards the front surface, and at least one binding surface to bind light rays emitted by the light sources associated with the binding surface to the light guide. The light device further comprises a carrier situated opposite the rear surface of the light guide and configured to reflect light rays that have escaped from the light guide through the rear surface back to the light guide. The cover comprises at least one impermeable region preventing light rays from passing out of the cover, and at least one permeable region to allow light rays to pass through the cover out of the light device.

In one of preferred embodiments, at least one of the impermeable regions is made in the form of a layer situated anywhere within the thickness of the cover and/or forms a part of the cover surface.

In another preferred embodiment, at least one of the impermeable regions is made of a paint or metal coat.

Preferably, at least one of the impermeable regions has reflective properties enabling reflection of light rays that have left the light guide from the impermeable region back to the light guide.

The surfaces of the impermeable regions may be advantageously parallel to the surface of the cover in their location.

In one of preferred embodiments, the permeable and impermeable regions are configured to produce the required shape of the inscription or logo with the light sources on.

The mutual configuration of the permeable and impermeable regions is advantageously such that the logo or inscriptions are visible with the light sources off as well.

In another preferred embodiment, the permeable and impermeable regions have mutually different colours.

In another preferred embodiment, the permeable region is fitted with semi-permeable metal plating, partly permeable paint or another treatment to reduce passage of light rays.

In another preferred embodiment, the carrier is equipped with at least one reflective region situated opposite the rear surface of the light guide to reflect light rays that have escaped from the light guide through its rear surface back to the light guide.

The reflective region may be advantageously situated opposite an overwhelming majority of the rear surface of the light guide or opposite the whole rear surface of the light guide.

The reflective region/s may advantageously be situated on one plane or on one convex or concave surface.

The reflective region may be adapted to diffuse light rays.

In another preferred embodiment, the location and design of the unbinding element is intended to direct most light rays that fall onto the unbinding elements towards the permeable regions of the cover.

In another preferred embodiment, the front surface is equipped with deflecting optical elements configured for defined deflection of light rays back to the light guide.

The deflecting optical elements may be e.g. coloured coats, metal plating or an optical structure calculated for defined deflection of light rays.

In one of preferred embodiments, the deflecting optical elements are situated approximately in alignment behind the impermeable regions.

In another preferred embodiment, at least one of the permeable regions is conceived as a light filter designed to homogenize or change the colour of the resulting light beam of light rays.

In another preferred embodiment, the light guide has the shape of a plate with a curvature of the front surface corresponding to the curvature of the cover.

OVERVIEW OF FIGURES IN THE DRAWINGS

Figure 2:
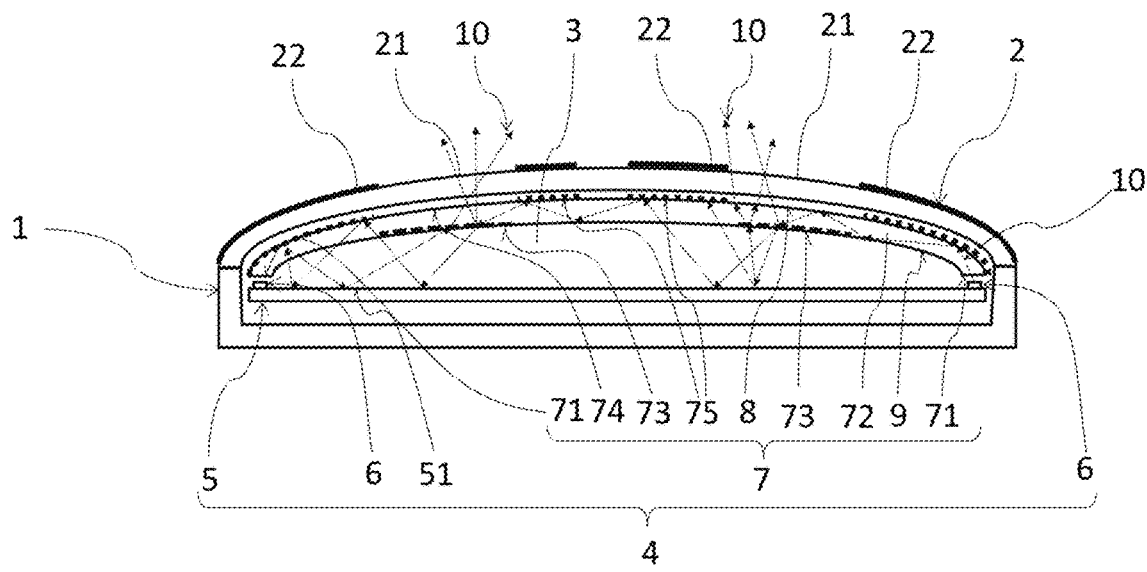
Figure 3:
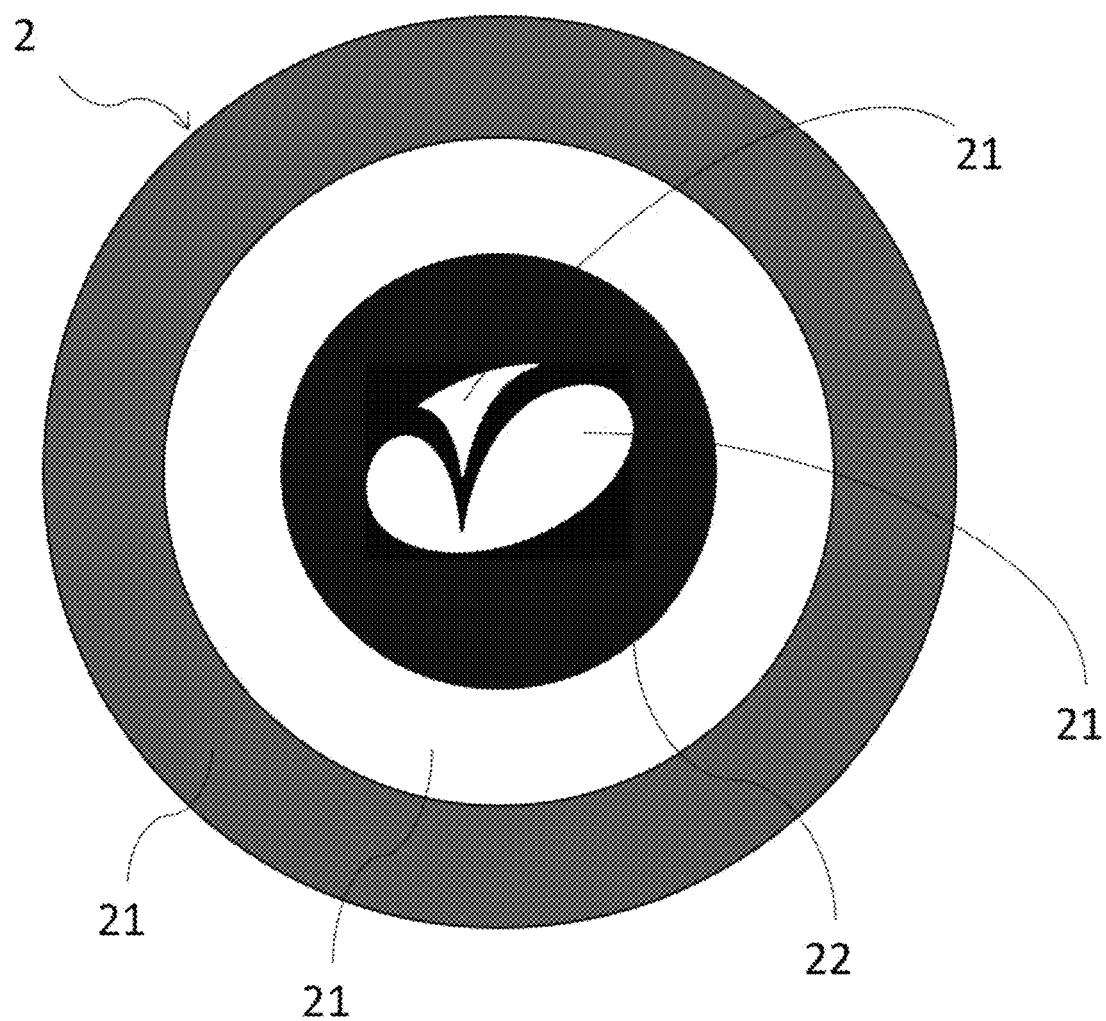

The invention will be clarified in more detail in a non-limiting way by means of embodiment examples of the light device or its parts with reference to attached drawings wherein:

FIG. 1 shows the first embodiment example of a light device according to the invention in a partial sectional view of the housing and cover of the light device, FIG. 2 shows the second embodiment example of a light device according to the invention in a partial sectional view of the housing and cover of the light device, and FIG. 3 shows the front view of the third embodiment example of the light device.

EXAMPLES OF EMBODIMENTS

FIG. 1 shows the first embodiment example of a light device according to the invention. The light device comprises a housing 1 and a cover 2, e.g., a covering glass, which together define an inner chamber 3 where the light unit 4 is housed.

The cover 2 comprises impermeable regions 22 that light rays 10 that fall onto them after their exit from the front surface 8 of the light guide 7 cannot pass through. The impermeable regions 22 are preferably produced as layers situated anywhere within the thickness of the cover 2 and/or in such a way that they form parts of the cover 2 surface. They may be e.g., produced using the process of multiple injection during the production of the cover 2, or for instance with paint or metal coating (applied by metal plating etc.). Preferably, the said layers have good reflective properties enabling good reflection of light rays 10 that have left the light guide 7 and fallen onto these layers back to the light guide 7. The surfaces of the impermeable regions 22 are preferably parallel to the cover 2 surface in their location as shown in FIG. 1, but they may also be arranged obliquely with respect to the cover 2 surface. The cover 2 further comprises permeable regions 21 that may be permeable for light to a variable degree, so the permeable region 21 may be fitted with semi-permeable metal plating, partly permeable paint or another treatment to partly reduce passing of light rays 10 through the permeable region 21. The permeable regions 21 and impermeable regions 22 are configured to produce the required shape of an inscription or logo with the light sources 6 on. The mutual configuration of the permeable and impermeable regions 21, 22 is advantageously such that the logo or inscription are also visible with the light sources 6 off, which can be achieved e.g., in such a way that the permeable and impermeable regions 21, 22 have mutually different colours, or in the permeable region 21, partly permeable metal plating can be used.

As shown in FIG. 1, the light unit 4 comprises the carrier 5 of at least one light source 6 and a light guide 7 of an optically transparent material. The surface of the light guide 7 comprises entry areas 71 to bind light rays 10 generated by the light sources 6 to the light guide 7, a front surface 8 for the exit of light rays 10 from the light guide 7, and a rear surface 9 of the light guide 7 that comprises unbinding elements 73 made e.g., as a prismatic structure, colour coating, graining etc. to direct light rays 10 towards the front surface 8. Light rays 10 bound by the entry areas 71 into the light guide 7 propagate along the light guide 7 based on the total reflection principle. Thus, if the angle of incidence of a light ray 10 on the front surface 8 of the light guide 7 is bigger than the critical angle, the light ray 10 is reflected from the front surface 8 to the light guide 7 and proceeds along the light guide 7 until it falls on the front surface 8 at a smaller angle than the critical angle. The exit of light rays 10 from the light guide 7 is supported by the above-mentioned unbinding elements 73, which the rear surface 9 of the light guide 7 is equipped with, that are configured in such a way to reflect light rays 10 towards the front surface 8 at angles of incidence (angle with respect to the normal line at the point of incidence) onto the front surface 8 sufficiently small for the exit of light rays 10 from the front surface 8 out of the light guide 7.

The impermeable regions 22 of the cover 2 are advantageously adapted to reflect light rays 10 back to the light guide 7. Light rays 10 that escape from the light guide 7 through its rear surface 9 are returned to the light guide 7 by the carrier 5, which is fitted with a reflective region 51 situated opposite the rear surface 9 of the light guide 7 for this purpose. The reflective region 51 may also be additionally adapted to diffuse light rays 10. The embodiment example shown indicates that the reflective region 51 is situated opposite the whole rear surface 9 of the light guide 7. Alternatively, embodiments are possible wherein the carrier 5 comprises multiple reflective regions 51 next to each other, or one reflective region 51 that does not cover the whole carrier 5 and is only situated opposite a part of the rear surface 9 of the light guide. The location and execution of the unbinding elements 73 is preferably designed in such a way that light rays 10 can be preferentially directed to the permeable regions of the cover 2. The reflective region 51 or regions 51 are advantageously situated on one plane or on one convex or concave surface.

FIG. 2 shows the second embodiment example of the invention. This embodiment differs from the above-mentioned first embodiment in that light rays 10 do not exit through the whole front surface 8 of the light guide 7, but through an exit area 74 or exit areas 74 that only form a part of the front surface 8 of the light guide. FIG. 2 shows a case wherein the front surface comprises multiple front exit areas 74 for the exit of light rays 10 from the light guide 7. The front exit areas 74 are separated from each other by regions fitted with deflecting optical elements 75 configured for defined deflection of light rays 10 back to the light guide 7. The deflecting optical elements 75 may be coloured coats, metal plating or an optical structure calculated for defined deflection of light rays 10. Thus, if light rays 10 that propagate along the light guide 7 fall onto a deflecting optical element 75, they are deflected back to the light guide 7 and will not exit from the front surface 8 of the light guide 7. Therefore, besides the impermeable regions 22 and unbinding elements 73, the deflecting optical elements 75 are other means the design and location of which can be used to influence, in a defined way, the course of movement of light rays 10 along the light guide 7 and the intensity of the output and total light efficiency of the output of light rays 10 from individual exit areas 21 of the cover 2. Thus, for instance a defined difference of output intensities of light rays 10 in different exit areas 21 can be achieved, which significantly extends the designer options of creating shapes, inscriptions or logos that are visible when the cover 2 is viewed from the outside of the light device. As for instance shown by the embodiment example of FIG. 2, the deflecting optical elements 75 may e.g., be situated approximately in alignment behind the impermeable regions 22. This is, however, only one of the location possibilities because what matters is the design of the deflecting optical elements 75 as well as the mutual positioning of the deflecting optical elements 75 with respect to the unbinding elements 73, and the configuration of the unbinding elements 73.

FIG. 3 shows a front view of the third embodiment example of the light device. This front view shows the cover 2 where an exemplary image pattern produced by the light device is displayed. As this embodiment indicates, the cover comprises an impermeable region 22 and permeable regions 21. The permeable regions 21 are of dual configuration when a permeable region 21 of one of the configurations works as a light filter designed to homogenize or change the colour of the resulting light beam of the light rays 10. In the example shown, the cover 2 and the light guide 7 have the shape of convex plate while the shape of the front surface 8 with its curvature corresponds to the curvature of the cover 2. However, the invention is not only limited to a plate-like shape of the light guide, i.e., the case when the light guide has the shape of a curved or planar plate, but it also comprises embodiments with light guides of other shapes.

LIST OF REFERENCE MARKS

1—housing
2—cover
3—inner chamber
4—light unit
5—carrier
6—light source
7—light guide
8—front surface
9—rear surface
10—light ray
21—permeable region
22—impermeable region
51—reflective region
71—entry area
72—body
73—unbinding element
74—exit area
75—deflecting optical element

The invention claimed is:

1. A light device of a motor vehicle comprising a light unit and a cover formed as a plate having a first rear surface and a first front surface and separating the light unit from the external environment of the light device,
wherein the light unit comprises
a light guide with
a second front surface intended for the exit of light rays from the light guide and facing the first rear surface,
a second rear surface comprising unbinding elements configured to reflect light rays towards the second front surface, and
at least one binding surface to bind light rays emitted by the light source associated with the binding surface to the light guide,
wherein the first rear surface and the second front surface are separated and mutually connected by a first gap,
a carrier with a third front surface facing the second rear surface and configured to reflect light rays that have escaped from the light guide through the second rear surface back to the light guide,
wherein the third front surface and the second rear surface are separated and mutually connected by a second gap,
wherein the cover comprises at least one impermeable region preventing light rays from passing out of the first front surface into the external environment, and at least one permeable region allowing light rays to pass through the first front surface out of the light device into the external environment.

2. The light device according to claim 1, wherein at least one of the impermeable regions is made in the form of a layer situated anywhere within the thickness of the cover plate or on the first front surface.

3. The light device according to claim 2, wherein at least one of the impermeable regions is constituted by a paint or metal coat on the first front surface.

4. The light device according to claim 1, wherein at least one of the impermeable regions has reflective properties to reflect incident light rays back to the light guide.

5. The light device according to claim 2, wherein the layer situated within the thickness of the cover plate is parallel to the first front surface faced by the layer.

6. The light device according to claim 1, wherein the permeable and impermeable regions are configured to produce, for an observer outside the motor vehicle, a shape of a character inscription or logo of the motor vehicle when the light sources are on.

7. The light device according to claim 1, wherein permeable and impermeable regions are configured to produce, for an observer outside the motor vehicle, a shape of a character inscription or logo of the motor vehicle when the light sources are off.

8. The light device according to claim 1, wherein the permeable and impermeable regions have mutually different colours.

9. The light device according to claim 1, wherein the permeable region is fitted with semi-permeable metal plating, partly permeable paint or another treatment to partly reduce passing of light rays.

10. The light device according to claim 1, wherein the third front surface is equipped with at least one reflective region facing the second rear surface to reflect light rays that have escaped from the light guide through the second rear surface back to the light guide.

11. The light device according to claim 10, wherein the reflective region is situated opposite an overwhelming majority of or the whole the second rear surface.

12. The light device according to claim 10, wherein the third front surface is planar, convex or concave.

13. The light device according to claim 10, wherein the reflective region is adapted for diffusion of light rays.

14. The light device according to claim 1, wherein the location and design of the unbinding elements is adapted to direct most light rays that fall onto the unbinding elements towards the permeable regions of the cover.

15. The light device according to claim 1, wherein the second front surface of the light guide is fitted with reflecting optical elements configured to reflect light rays in a predetermined directions back to the light guide.

16. The light guide according to claim 15, wherein the reflecting optical elements are coloured coats, metal plating or an optical structure.

17. The light device according to claim 15, wherein the reflecting optical elements are situated approximately in alignment behind the impermeable regions of the cover.

18. A light device according to claim 1, wherein at least one of the permeable regions is conceived as a light filter designed to homogenize or change the colour of the resulting light beam of light rays.

19. The light device according to claim 1, wherein the light guide has the shape of a plate with a curvature of the second front surface corresponding to the curvature of the first rear surface.

* * * * *